(No Model.)  2 Sheets—Sheet 1.

T. G. EASON.
PLOW.

No. 446,965.  Patented Feb. 24, 1891.

Witnesses  Inventor
Jas. K. McCathran  Thos. G. Eason
Wm. Bagger  By his Attorneys,
  C. A. Snow & Co.

THE NORRIS PETERS CO., PHOTO-LITHO., WASHINGTON, D. C.

(No Model.) 2 Sheets—Sheet 2.

T. G. EASON.
PLOW.

No. 446,965. Patented Feb. 24, 1891.

Witnesses
Jas. K. McCathran
Wm. Bagger

Inventor
Thos. G. Eason
By his Attorneys,
C. A. Snow & Co.

UNITED STATES PATENT OFFICE.

THOMAS GAY EASON, OF JUNCTION CITY, TEXAS.

PLOW.

SPECIFICATION forming part of Letters Patent No. 446,965, dated February 24, 1891.

Application filed July 12, 1890. Serial No. 358,558. (No model.)

*To all whom it may concern:*

Be it known that I, THOMAS GAY EASON, a citizen of the United States, residing at Junction City, in the county of Kimble and State of Texas, have invented a new and useful Plow, of which the following is a specification.

This invention relates to plows; and it has for its object to construct a plow which shall be suitable for breaking land or for cultivating crops, which may be easily adjusted and adapted to perform various kinds of work for which plows are customarily employed, which may be used as a walking or sulky and as a single or gang plow, and which shall possess superior advantages in point of simplicity, durability, and general efficiency.

With these ends in view the invention consists in the improved construction, arrangement, and combination of parts, which will be hereinafter fully described, and particularly pointed out in the claims.

Figure 1:
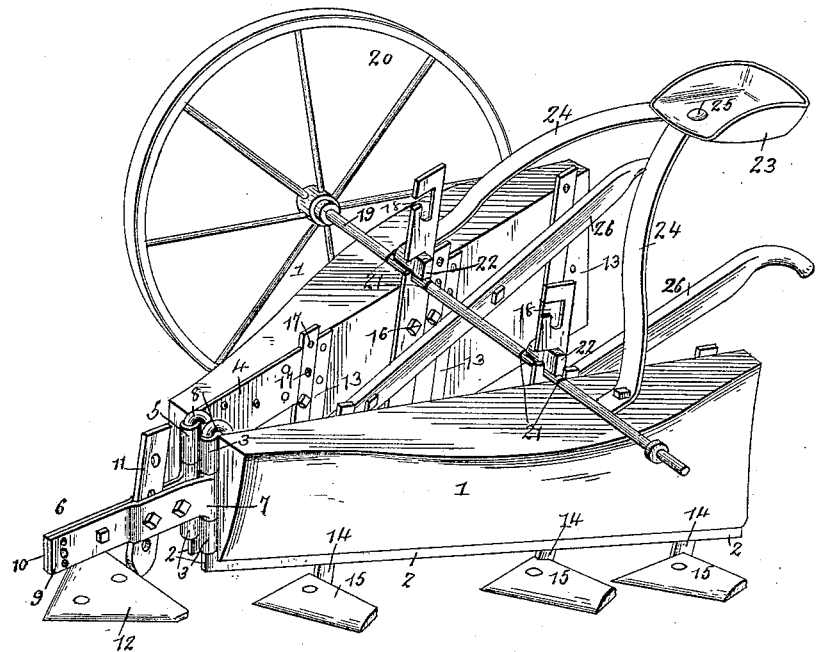
Figure 2:
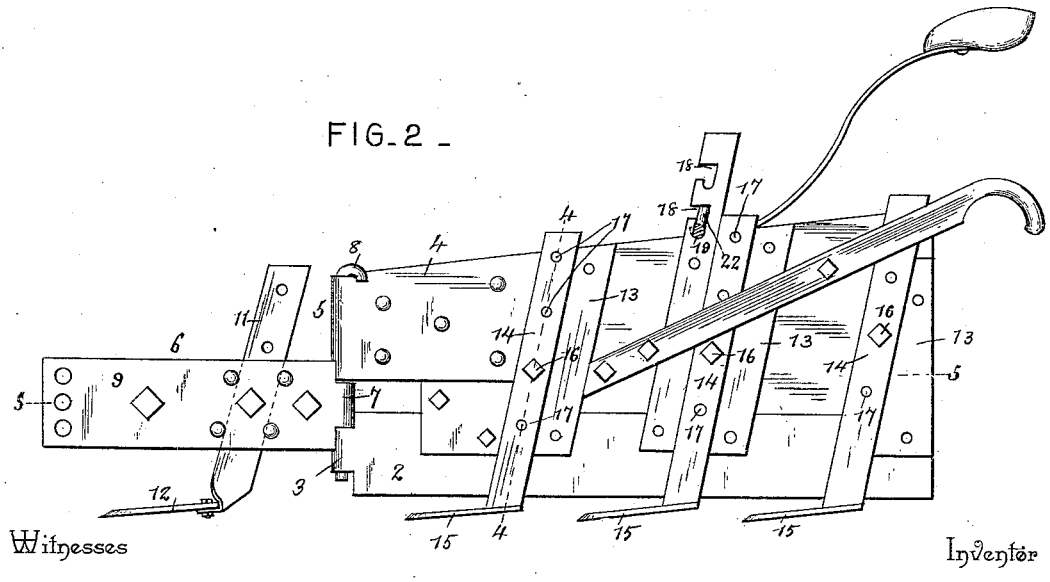
Figure 3:
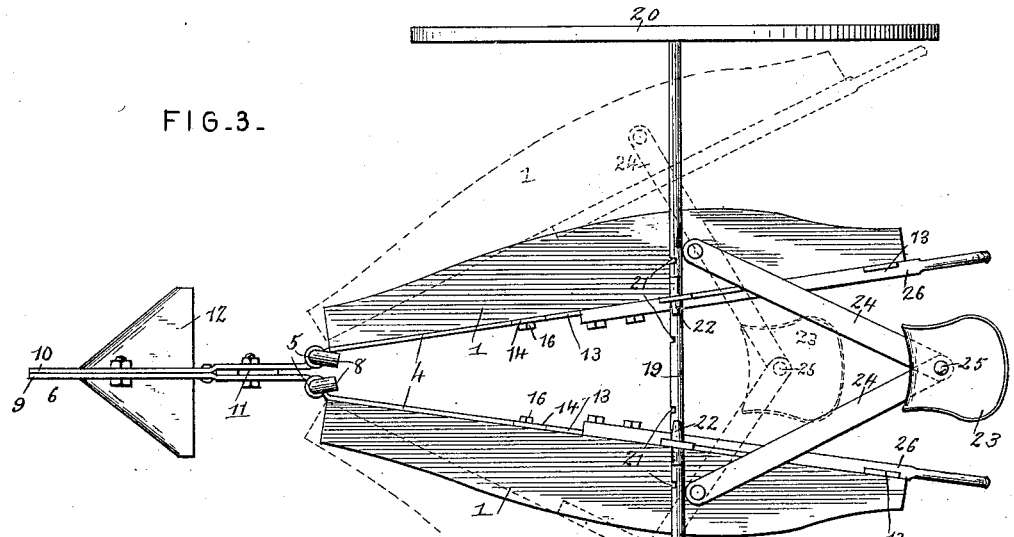
Figure 4:
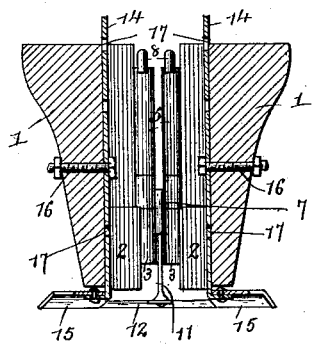
Figure 5:
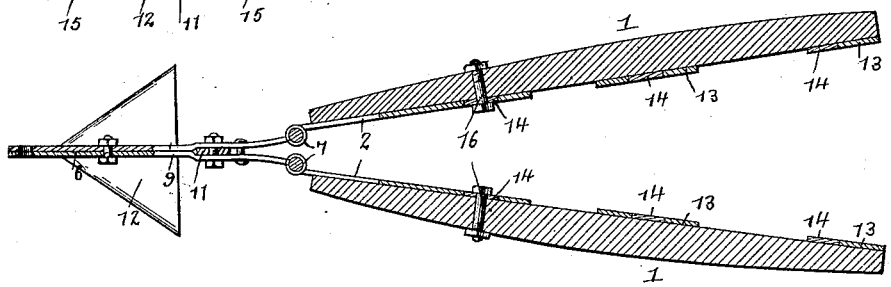

In the drawings hereto annexed, Figure 1 is a perspective view of a plow embodying my improvements. Fig. 2 is a longitudinal vertical sectional view of the same. Fig. 3 is a top view, with dotted lines showing the sides or mold-boards of the plow spread to their utmost capacity. Fig. 4 is transverse sectional view taken on the line 4 4 of Fig. 2. Fig. 5 is a horizontal sectional view taken on the line 5 5 of Fig. 2.

Like numerals of reference indicate like parts in all the figures.

The main frame of my improved plow is composed of the wooden sides or frame-bars 1 1, which I term the "mold-boards," and which are provided at their lower inner edges with longitudinal vertical steel strips or shares 2 2. The front ends of said strips are provided with eyes 3.

4 4 are hinge-leaves, which are secured at the upper front corners of the mold-boards 1 1, and which are provided at their front ends with eyes 5 5.

6 designates a clevis, the front end of which is suitably adapted for the attachment of the draft, and the rear end of which is provided with eyes 7, fitting between the eyes 3 and 5 of the shares 2, and strips 4 to receive the pintles 8, by means of which the mold-boards of the plow are adjustably connected together. The clevis is constructed of two separate plates 9 and 10 bolted together, and between the said plates is interposed a standard 11, the lower end of which carries the plow-blade 12, which is nearly horizontal, so as to form what is generally known as a "sub-soiler."

The inner sides of the mold-boards 1 1 are provided with metallic strips or flanges 13 13, between which are arranged the shanks or standards 14, the lower ends of which carry the plows or subsoilers 15. The shanks 14 are vertically adjustable with relation to the mold-boards 1 by means of the screws or bolts 16, by means of which they are secured to the latter, each of said standards being provided with a series of perforations 17 for the passage of the said screws or bolts. I prefer that the plows or subsoilers 15 at the lower ends of the standards 14 should be approximately horizontal; but this is not necessary to the successful operation of my invention.

Two of the strips or cleats 13—one upon each of the mold-boards 1—are extended above the upper edges of said mold-boards and are provided with L-shaped slots 18, forming bearings for a transverse shaft or axle 19, the ends of which are provided with the supporting-wheels 20. Said shaft is provided near its ends with notches 21, adapted to engage the L-shaped notches 18 in the cleats 13, to enable the shaft or axle to be retained at any desired adjustment in the said cleats by means of wedges 22. It will be seen that by this arrangement the rear ends of the mold-boards may be adjusted at any desired distance apart, according to the width of the strip of land which it may be desired to plow or to cultivate at a single operation. It is also obvious that by adjusting the rear ends of the mold-boards closer together the individual plows or subsoilers will be caused to operate closer together, and thus to more effectually work and pulverize the soil, while by spreading the rear ends of the mold-boards farther apart a wider strip of land may be operated upon at each operation.

The driver's seat, which is designated by 23, is mounted upon two independent spring-bars 24 24, each of which is pivotally connected to the upper side of one of the mold-boards, while both of the said spring-bars are connected with the seat by a common rivet or swivel joint 25. It will be seen by this arrangement that the mold-boards may be laterally adjusted without necessitating any independent adjustment of the seat or its supporting-bars.

Handles 26, of ordinary construction, are secured to the inner sides of the mold-boards in order that the latter, when the device is used as a walking-plow, may be conveniently controlled by the operator. When the device is used as a sulky or riding plow, suitable mechanism may be employed for the purpose of adjusting and regulating the parts of the same.

The frame-beams or mold-boards 1 1 have been described as being preferably constructed of wood or metal. I desire to add that the outer sides of said mold-boards are to be suitably curved or concaved, so as to be wider at their upper edges and rear ends than at their lower edges and front ends. The curves or contour of the said plow-beams will of course be determined by the nature of the use to which the device is to be put, and I reserve the right to adopt such outlines of construction as may appear to be most suitable for the work intended to be performed.

The device may be used as a cultivator by simply removing the standard 11, attached to the clevis and carrying the plow or subsoiler 12. The latter, it should be noted, is arranged, when in use, to run at a greater depth than the plows or subsoilers attached to the mold-boards.

Having thus described my invention, what I claim and desire to secure by Letters Patent of the United States, is—

1. The combination of the mold-boards or frame-beams, the strips or shares at the lower inner edges of the same provided at their front ends with eyes 3, the hinge-plates 4, secured at the upper front corners of the mold-boards and provided with eyes 5, the clevis 6, having eyes 7 7, the pintles 8 8, and the shank 11, mounted adjustably between plates 9 10, of which the clevis is composed, and having the subsoiler 12, substantially as and for the purpose set forth.

2. The combination of the mold-boards or frame-beams, the shares at the lower inner edges of the same, the hinge-strips at their upper inner corners, the clevis forming a connecting-joint, and the plow or subsoiler secured to a shank attached adjustably to said clevis, substantially as set forth.

3. The combination of the mold-boards or frame-beams hinged together at their front ends and having shares at their lower inner edges, the vertically-adjustable shanks mounted upon the inner sides of said mold-boards and carrying plows or subsoilers at their lower ends, the transverse shaft or axle carrying supporting-wheels, and means for connecting the frame-beams or mold-boards adjustably with said shaft or axle, substantially as set forth.

4. The combination of the mold-boards or frame-beams hinged at their front ends, the cleats upon the inner sides of said mold-boards, forming bearings for the vertically-adjustable plow-carrying standards and having L-shaped notches at their upper ends, the grooved or notched shaft or axle having the supporting-wheels, the connecting-wedges, and the seat-supports, connected pivotally with the frame-beams and having their upper ends connected with each other and with the seat by a single pivot, substantially as set forth.

5. A plow or cultivator comprising, in combination, a pair of frame-beams or mold-boards hinged at their front ends to a clevis having a vertically-adjustable shank carrying a subsoiler, shares at the lower edges of said mold-boards, vertically-adjustable shanks upon the inner edges of said mold-boards, carrying plows or subsoilers at their lower ends, a shaft or axle mounted adjustably in bearings upon the said frame-beams, and the pivoted seat-supports carrying a pivoted seat, substantially as herein set forth.

In testimony that I claim the foregoing as my own I have hereto affixed my signature in presence of two witnesses.

THOMAS GAY EASON.

Witnesses:
AMOS WHITAKER,
AND. PATERSON.